US009444906B2

(12) United States Patent
Crowe et al.

(10) Patent No.: US 9,444,906 B2
(45) Date of Patent: Sep. 13, 2016

(54) CONTENT DELIVERY NETWORK WITH DEEP CACHING INFRASTRUCTURE

(71) Applicants: James Q. Crowe, Englewood, CO (US); John F. Waters, Jr., Boulder, CO (US); Andrew Dugan, Superior, CO (US); Christopher Newton, Westlake Village, CA (US); Laurence Lipstone, Calabasas, CA (US); Kenneth Brookman, Denver, CO (US); Joseph Lawrence, Boulder, CO (US); Andrew Swart, Pennington, NJ (US); David Fullagar, Boulder, CO (US); Kevin Paul, Kailua, HI (US)

(72) Inventors: James Q. Crowe, Englewood, CO (US); John F. Waters, Jr., Boulder, CO (US); Andrew Dugan, Superior, CO (US); Christopher Newton, Westlake Village, CA (US); Laurence Lipstone, Calabasas, CA (US); Kenneth Brookman, Denver, CO (US); Joseph Lawrence, Boulder, CO (US); Andrew Swart, Pennington, NJ (US); David Fullagar, Boulder, CO (US); Kevin Paul, Kailua, HI (US)

(73) Assignee: LEVEL 3 COMMUNICATIONS, LLC, Broomfield, CO (US)

(*) Notice: Subject to any disclaimer, the term of this patent is extended or adjusted under 35 U.S.C. 154(b) by 147 days.

(21) Appl. No.: 14/537,706

(22) Filed: Nov. 10, 2014

(65) Prior Publication Data

US 2015/0067174 A1  Mar. 5, 2015

Related U.S. Application Data

(62) Division of application No. 13/360,551, filed on Jan. 27, 2012, now Pat. No. 8,886,742.

(60) Provisional application No. 61/437,544, filed on Jan. 28, 2011, provisional application No. 61/486,039, filed on May 13, 2011.

(51) Int. Cl.
*H04L 29/08* (2006.01)

(52) U.S. Cl.
CPC ....... *H04L 67/2847* (2013.01); *H04L 67/2842* (2013.01)

(58) Field of Classification Search
CPC .................. H04L 67/2847; H04L 67/2842
See application file for complete search history.

(56) References Cited

U.S. PATENT DOCUMENTS 6,167,438 A * 12/2000 Yates ................ G06F 17/30902
707/E17.12

(Continued)

FOREIGN PATENT DOCUMENTS

EP      2194691 A1      6/2010

OTHER PUBLICATIONS

Argentina Examination Report, dated Jan. 12, 2015, Application No. P120101676, filed May 11, 2012; 2 pgs.

(Continued)

*Primary Examiner* — Jimmy H Tran

(57) ABSTRACT

Embodiments herein include methods and systems for use in delivering resources to a client device over a local network. An exemplary system comprises a plurality of caching devices operable to cache resources on behalf of a plurality of content providers, and a local caching device communicatively situated between an access network and the client device, wherein the access network is communicably situated between the plurality of caching devices and the local caching device. The local caching device is operable to retrieve a requested resource from at least one of the plurality of caching devices, deliver the requested resource to the client device over the local network, and store the requested resource for future requests by other client devices.

5 Claims, 13 Drawing Sheets

(56) References Cited

U.S. PATENT DOCUMENTS

| | | | |
|---|---|---|---|
| 7,016,883 B2 | | 3/2006 | Dispensa et al. |
| 7,277,942 B2 * | | 10/2007 | Inoue .................. G06F 17/3087 455/412.1 |
| 7,454,394 B2 | | 11/2008 | Dispensa et al. |
| 7,760,719 B2 | | 7/2010 | Yik et al. |
| 8,161,159 B1 | | 4/2012 | Shetty et al. |
| 8,171,161 B2 | | 5/2012 | Schwimer |
| 8,683,221 B2 | | 3/2014 | Peet et al. |
| 9,049,153 B2 | | 6/2015 | Casado et al. |
| 2002/0010798 A1 | | 1/2002 | Ben-Shaul et al. |
| 2003/0062990 A1 | | 4/2003 | Schaeffer, Jr. et al. |
| 2003/0149581 A1 | | 8/2003 | Chaudhri et al. |
| 2003/0200276 A1 | | 10/2003 | Dispensa et al. |
| 2004/0010562 A1 | | 1/2004 | Itonaga |
| 2006/0002386 A1 | | 1/2006 | Yik et al. |
| 2006/0136563 A1 | | 6/2006 | Dispensa et al. |
| 2006/0168088 A1 | | 7/2006 | Leighton et al. |
| 2007/0140145 A1 | | 6/2007 | Kumar et al. |
| 2008/0086550 A1 | | 4/2008 | Evora et al. |
| 2008/0155061 A1 * | | 6/2008 | Afergan ............ H04L 29/08576 709/218 |
| 2008/0222281 A1 | | 9/2008 | Dilley et al. |
| 2008/0228920 A1 | | 9/2008 | Souders et al. |
| 2009/0119397 A1 | | 5/2009 | Neerdaels |
| 2009/0199281 A1 | | 8/2009 | Cai et al. |
| 2010/0034089 A1 | | 2/2010 | Kovvali et al. |
| 2010/0138542 A1 | | 6/2010 | Davis et al. |
| 2010/0138900 A1 | | 6/2010 | Peterka et al. |
| 2010/0177680 A1 | | 7/2010 | Fischer et al. |
| 2010/0192212 A1 | | 7/2010 | Raleigh |
| 2010/0217801 A1 | | 8/2010 | Leighton et al. |
| 2010/0257258 A1 | | 10/2010 | Liu et al. |
| 2011/0078230 A1 * | | 3/2011 | Sepulveda ............ H04N 21/222 709/203 |
| 2011/0225312 A1 * | | 9/2011 | Liu .......................... H04L 12/18 709/231 |
| 2012/0054274 A1 | | 3/2012 | Schwimer |
| 2012/0079115 A1 | | 3/2012 | Richardson et al. |
| 2012/0191862 A1 | | 7/2012 | Kovvali et al. |
| 2012/0198075 A1 | | 8/2012 | Crowe |
| 2013/0018978 A1 | | 1/2013 | Crowe et al. |
| 2013/0058342 A1 | | 3/2013 | Casado et al. |
| 2013/0097309 A1 | | 4/2013 | Ma et al. |
| 2013/0179680 A1 | | 7/2013 | Peterka et al. |

OTHER PUBLICATIONS

European Extended Search Report, dated Jun. 12, 2014, Application No. 12739422.9, filed Jan. 27, 2012; 8 pgs.

International Preliminary Report on Patentability, dated Jul. 30, 2013, Int'l Appl. No. PCT/US2012/023023, Int'l Filing Dated Jan. 27, 2013; 8 pgs.

International Search Report, dated May 15, 2012, PCT/US12/023023, Intl filing date Jan. 27, 2012, 3 pgs.

Written Opinion, dated May 15, 2012, PCT/US2012/023023, Intl filing Jan. 27, 2012, 7 pgs.

Avramova, Z. et al., "Performance Analysis of a Caching Algorithm for a Catch-Up Television Service", *Multimedia Systems* Spring, Berlin, DE, vol. 17, No. 1 ; ISSN:1432-1882, DOI:10.1007/S00530-010-0201-1 Aug. 17, 2010 , pp. 5-18.

Chiang, Cho-Yu et al., "Caching neighborhood protocol: a foundation for building dynamic web caching hierarchies with proxy servers", *IEEE* Parallel Processing 1999. Proceedings. 1999 International Conference 1999, 8 pgs.

Egger, S. et al., "Same but Different?—Using Speech Signal Features for Comparing Conversational VoIP Quality Studies", IEEE ICC 2012—Communication QoS, Reliability and Modeling Symposium 2012 , pp. 1320-1324.

Han, D. et al., "Hulu in the Neighborhood", Communication Systems and Networks (Comsnets), 2011 Third International Conference On, IEEE; DOI: 10.1109/Comsnets.2011.5716501; ISBN: 978-1-4244-8952-7 Jan. 4, 2011 , pp. 1-10.

Jiang, Hai et al., "Performance Evaluation of Content Distribution in Hybrid CDN-P2P Network", Future Generation Communication and Networking, 2008; FGCN '08. Second International Conference on, IEEE, Piscataway, NJ USA; ISBN: 978-0-7695-3431-2 Dec. 13, 2008 , pp. 188-193.

Mori, T. et al., "Improving Deployability of Peer-Assisted CDN Platform with Incentive", Global telecommunications Conference, 2009; Globecom 2009, IEEE, Piscataway, NJ, USA; ISBN: 978-1-4244-4148-8 Nov. 30, 2009 , pp. 1-7.

Wauters, T. et al., "Co-operative Proxy Caching Algorithms for Time-Shifted IPTV Services", *Software Engineering and Advanced Applications* 2006. SEAA '06. 3 2nd Euromicro Conference on, IEEE, PI; DOI: 10.1109/Euromicro.2006.29; ISBN: 978-0-7695-2594-5 Aug. 1, 2006, pp. 379-386.

Yusoff, N. B. , "Performance Evaluation of QoS Provisioning Techniques for VoIP", *Information and Communication Technologies* ICTTA'06 2nd. vol. 2 IEEE 2006 , pp. 3622-3627.

U.S. Appl. No. 14/537,733, filed Nov. 10, 2014, Crowe et al.

European Examination Report, dated Jun. 27, 2016, Application No. 12739422.9, filed Jan. 27, 2012; 5 pgs.

* cited by examiner

CONTENT DELIVERY NETWORK WITH DEEP CACHING INFRASTRUCTURE

RELATED APPLICATIONS

This application is a divisional application of and claims benefit of priority to U.S. patent application Ser. No. 13/360,551, filed Jan. 27, 2012, titled "Content Delivery Network with Deep Caching Infrastructure," now U.S. Pat. No. 8,886,742, which claims priority to U.S. Provisional Patent Application No. 61/437,544, filed Jan. 28, 2011 and U.S. Provisional Patent Application No. 61/486,039, filed May 13, 2011, titled "Content Delivery Network with Deep Caching Infrastructure," wherein the entire contents of each are fully incorporated by reference herein for all purposes.

BACKGROUND

Networks that are engaged to deliver electronic resources, such as videos, images, audio files, documents, software, and the like, to end users on the Internet on behalf of owners and providers of those resources ("content providers") are commonly referred to as Content Delivery Networks (CDNs). A primary purpose of a CDN is to distribute resources efficiently to client devices on behalf of one or more content providers, preferably via a public Internet. Both end-users (clients) and content providers benefit from using a CDN. By using a CDN, a content provider is able to improve the speed and reliability of content delivery to its end-users, and delivery capability without deploying additional infrastructure. Clients benefit by being able to obtain content with fewer delays.

SUMMARY

Embodiments herein include an example system for use in delivering resources to client devices in a local network, wherein the system comprises a plurality of caching devices operable to cache resources on behalf of a plurality of content providers, and a local caching device communicatively situated between an access network and the client device. The access network is communicably situated between the plurality of caching devices and the local caching device. The local caching device is operable to, in response to a request for a resource by a client device, retrieve the requested resource from at least one of the plurality of caching devices, wherein the requested resource is transmitted between the at least one plurality of caching devices and the local caching device over the access network. The access network is further operable to deliver the requested resource to the client device over the local network and store the requested resource for future requests by other client devices.

In an example embodiment, at least one of the plurality of caching devices is part of a cluster of caching devices.

In an example embodiment, in response to the local caching device requesting the requested resource from the at least one of the plurality of caching devices, the at least one of the plurality of caching devices is operable to retrieve the requested resource from at least one of an origin server of the content provider associated with the requested resource and a peer caching device.

In an example embodiment, the local caching device is dedicated to the client device.

In an example embodiment, the local caching device is a master cache accessible by a community of local caching devices and the community of local caching devices is communicatively coupled via at least one of a shared wireless frequency and a shared powerline. Furthermore, a second local caching device can be prompted to opt-in to join the community of local caching devices.

In an example embodiment, a proxy device operable to intercept a request for the requested resource. In another example embodiment, the request is a Domain Name System (DNS) request and the proxy device is operable to redirect the client device to the local caching device for delivery of the requested resource over the local network. In another example embodiment, the request is an application protocol request such as a Hyper Text Transfer Protocol (HTTP) request. In yet another example embodiment, the proxy device is the local caching device and, in response to intercepting the request for the requested resource, the local caching device is operable to redirect the client device to a second local caching device communicatively situated between the access network and the client device. The second local caching device is operable to, in response to the redirected request by the client device, retrieve the requested resource from at least one of the plurality of caching devices, wherein the requested resource is transmitted between the at least one plurality of caching devices and the second local caching device over the access network. The second local caching device is also operable to deliver the requested resource to the client device over the local network and store the requested resource for future requests by other client devices.

In an example embodiment, the proxy device is operable to determine, based on certain criteria, to which of a plurality of local caching devices to redirect the client device for delivery of the requested resource. For example, the certain criteria for each of the plurality of local caching devices can comprise availability, relative load, relative connectivity, availability, and whether a given local caching device has a copy of the requested resource. The proxy device is operable to receive the certain criteria via a push or pull from the plurality of caching devices. In another example embodiment, the certain criteria is locally generated at the proxy device and is based on a request history at the proxy device.

Embodiments herein include an example method for proactively loading resources on a local caching device associated with a community of local caching devices, wherein the community of local caching devices is communicatively coupled via an access network to at least one content delivery network (CDN) caching device. The example method comprises steps for, in response to determining that a given resource meets certain popularity criteria and is not stored on the local caching device, determining whether the given resource is stored on at least one other local caching device in the community. If so, method comprises steps for retrieving the given resource from the at least one other local caching device, wherein the at least one other local caching device has determined that the given resource meets certain popularity criteria and has retrieved the given resource from the at least one CDN caching device via the access network. The example method further comprises steps for, in response to determining that the given resource is not stored on at least one other local caching device in the community, retrieving the given resource from the at least one CDN caching device via the access network.

The example method further comprises steps for prompting a given local caching device that is not already associated with the community of local caching devices to join the community of local caching devices, and, if the given local caching device affirmatively responds to the prompt to join the community of local caching devices, adding the given local caching device to the community of local caching devices.

In an example embodiment, the certain popularity criteria comprise a number of requests for the given resource that were received at the local caching device during a given time interval, availability of storage space on the local caching device, total capacity of the local caching device, type of storage on the local caching device, and popularity rankings of other resources stored on the local caching device.

Embodiments herein include an example system comprising a redirection server and a plurality of caching devices situated within a wireless network. The redirection server is operable to receive a request for a resource originating from a wireless client device connected to the wireless network, wherein the redirection server is further operable to select at least one of the plurality of caching devices to deliver the requested resource to the wireless client device based on at whether a caching device has the requested resource, proximity of the caching device to the wireless client device, and wireless network conditions. The selected at least one caching device is operable to initiate delivery of the requested resource to the wireless client device from within the wireless network.

In an example embodiment, the plurality of caching devices are operable to retrieve the requested resource from one or more content delivery network (CDN) caching devices communicatively coupled with the wireless network.

In an example embodiment, the redirection server is operable to intercept the request and determine whether to select at least one of the plurality of caching devices based on a popularity of the requested resource. The redirection server is also operable to redirect the wireless client to the at least one selected caching device for delivery of the requested resource.

In an example embodiment, the redirection server is situated within the wireless network.

In an example embodiment, a caching device is locally proximate to the wireless client device and is operable to wirelessly delivery the requested resource to the wireless client device. The locally proximate caching device is further operable to retrieve the requested resource from one or more content delivery network (CDN) caching devices communicatively coupled with the wireless network. In another embodiment, the locally proximate caching device is a Wi-Fi hotspot.

In an example embodiment, a caching device is situated within a cellular core network and/or a radio access network of the wireless network. In another embodiment, a caching device is proximately situated with at least one of a radio network controller (RNC), a serving general packet radio service (GPRS) support node (SGSN), and a gateway GPRS support node (GGSN) of the wireless network.

BRIEF DESCRIPTION OF THE DRAWINGS

Other objects, features, and characteristics of the present invention, as well as the methods of operation and functions of the related elements of structure, will become more apparent upon consideration of the following description and the appended claims with reference to the accompanying drawings, all of which form a part of this specification.

DETAILED DESCRIPTION

Although the present invention has been described with reference to various embodiments, it will be understood that the invention is not limited to the details thereof. Various modifications and substitutions will occur to those of ordinary skill in the art.

Deep Caching with Access Networks

Figure 1:
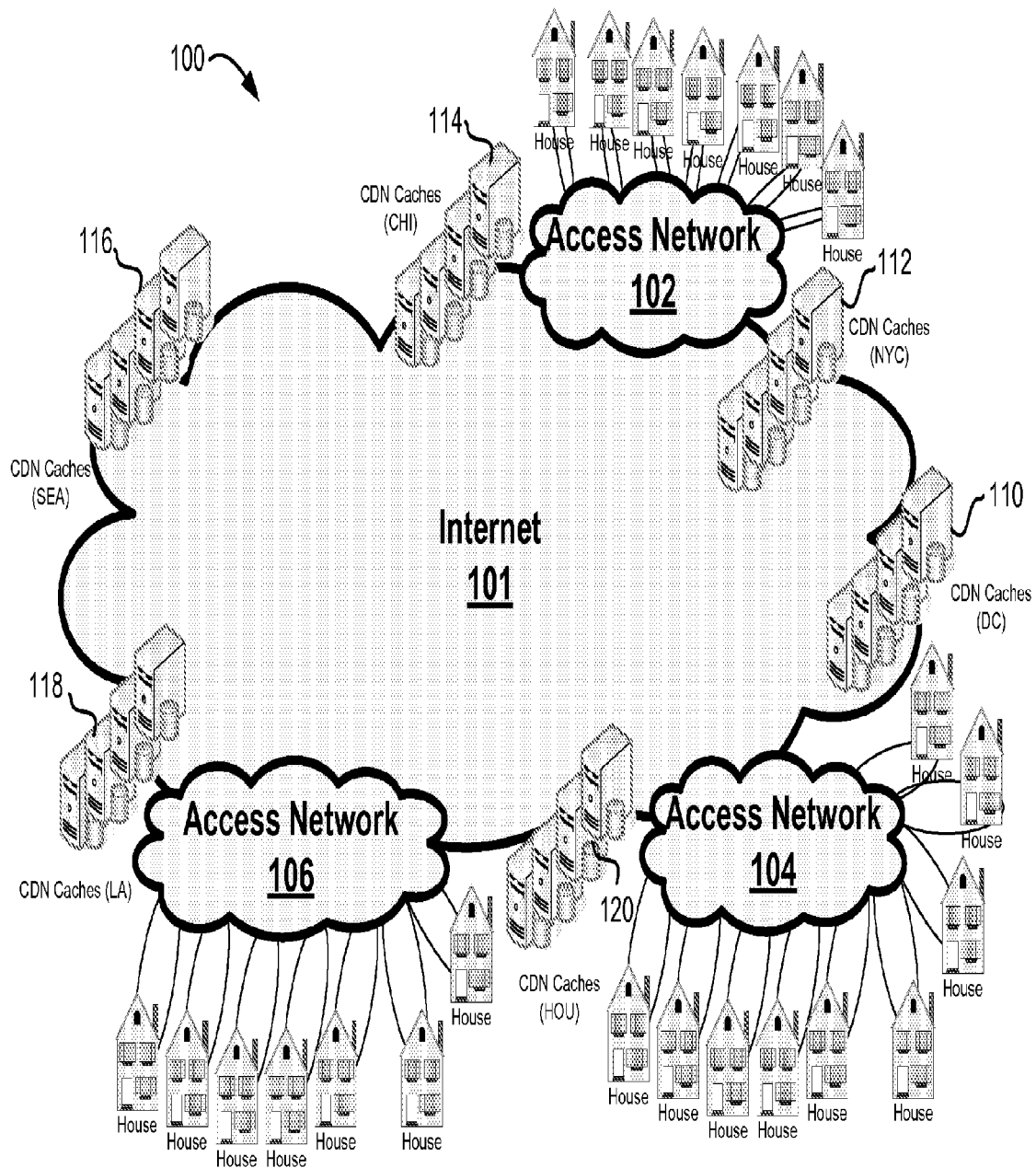
FIG. 1 illustrates an example network environment 100 suitable for implementing various embodiments disclosed herein, including a high level depiction of a content delivery network (CDN) in accordance with an embodiment of the present invention.

FIG. 1 illustrates an example network environment 100 suitable for implementing various embodiments disclosed herein. The example network environment 100 comprises the Internet 101 (i.e., a large and diverse public network comprising one or more interconnected asynchronous systems) communicably coupled to access networks 102, 104, and 106. Note that access networks 102, 104, and 106 can be under the control of or operated/maintained by one or more entities, such as, for example, one or more Internet Service Providers (ISPs) that provide access to the Internet 101 for consumers/end-users (e.g., residential, enterprise, etc.) and/or content providers. In the example network environment 100 of FIG. 1, each access network provides Internet access to several residential end-users, denoted as houses.

Network environment 100 further comprises one or more CDNs for delivery of electronic resources (e.g., video, images, music, software, games, cloud resources, etc.) and other content from content providers to end-users across Internet 101. The one or more CDNs each have a number of CDN caches located in various strategic locations (both physical and logical) in Internet 101—e.g., CDN cache cluster 110 (DC), CDN cache cluster 112 (NYC), CDN cache cluster 114 (CHI), CDN cache cluster 116 (SEA), CDN cache cluster 118 (LA), and CDN cache cluster 120 (HOU).

Figure 2:
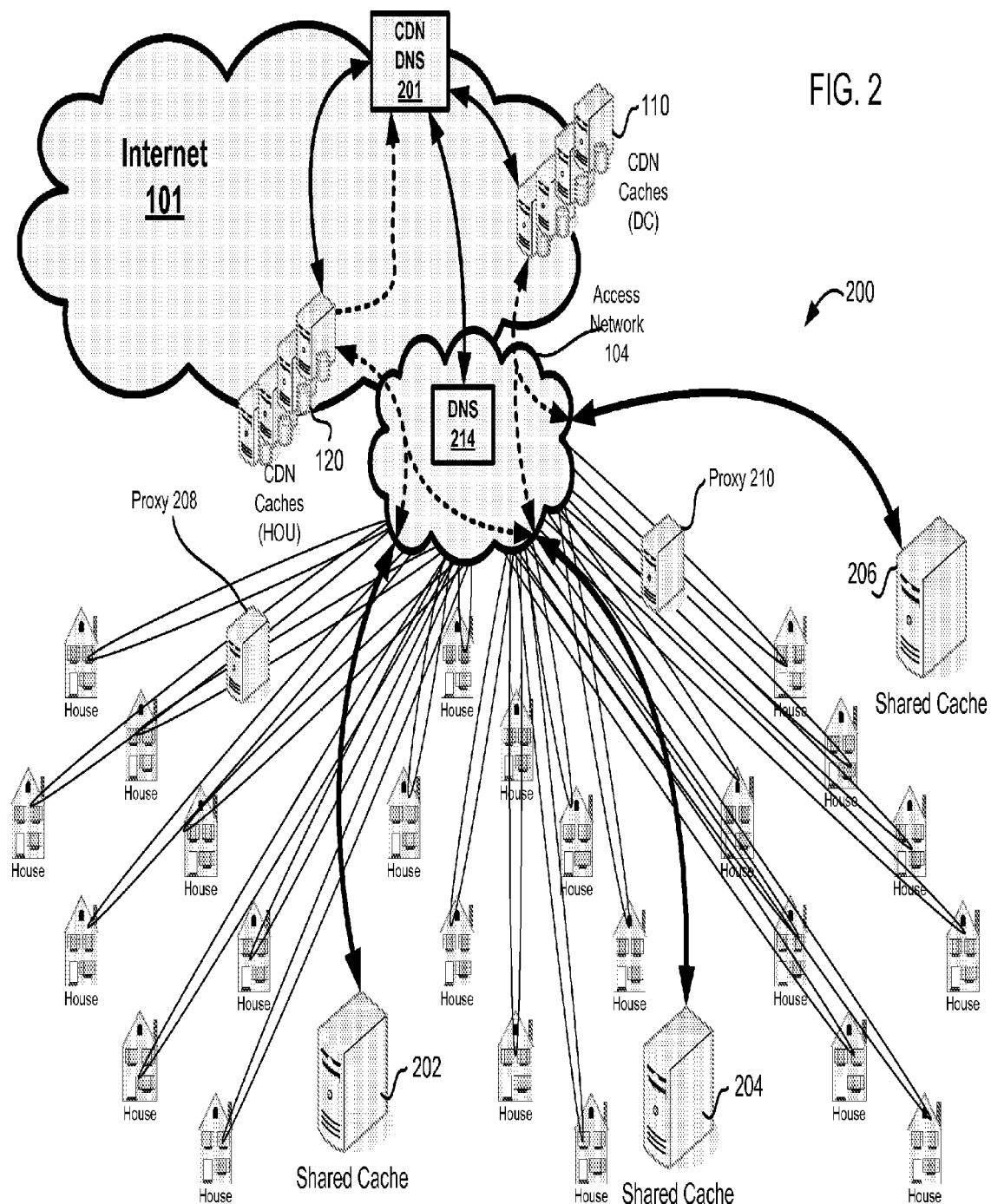
FIG. 2 illustrates the CDN of FIG. 1 having deep caching infrastructure in accordance with embodiments of the present invention.
Figure 3:
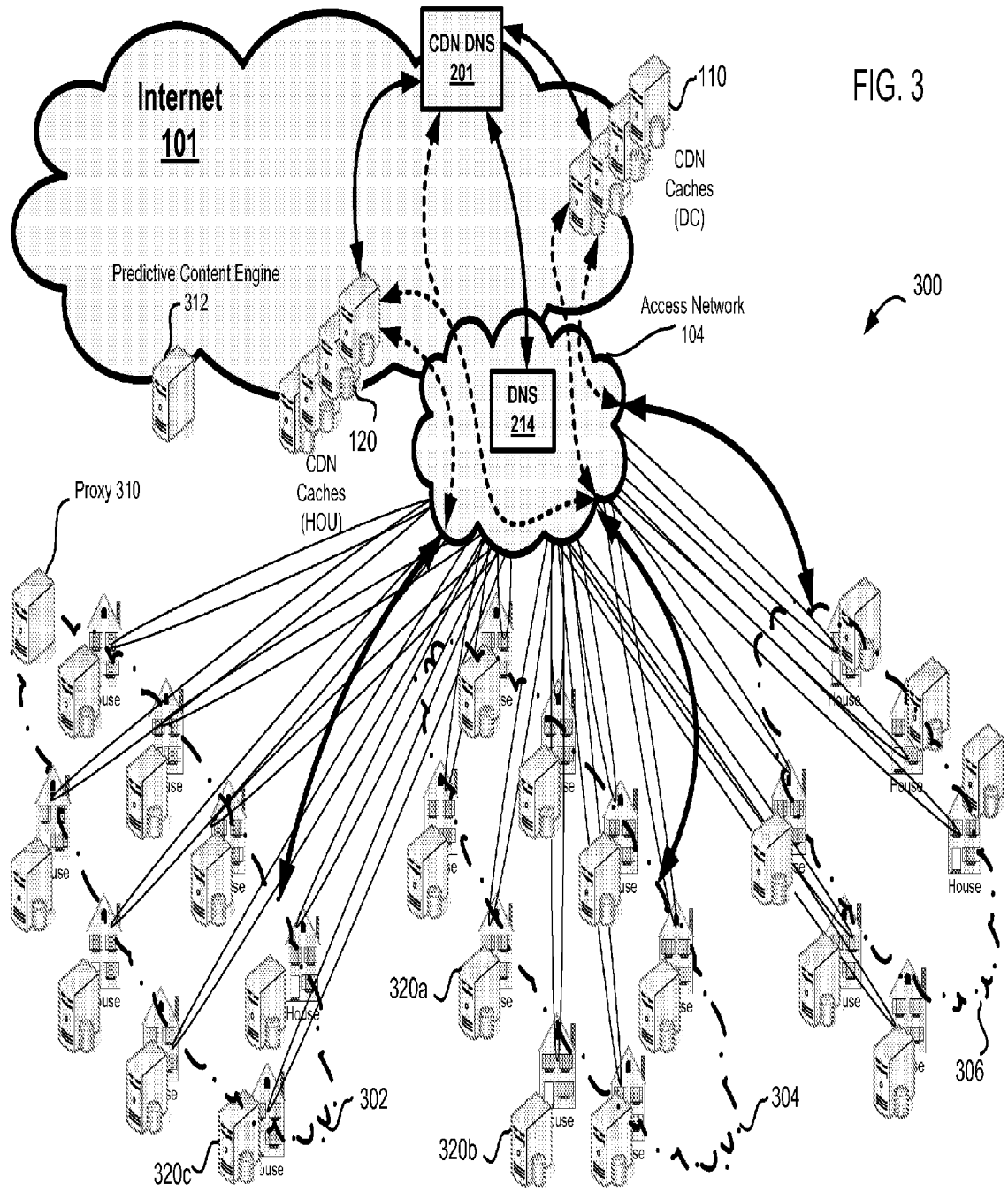
FIG. 3 illustrates the CDN of FIG. 1 having deep caching infrastructure in accordance with embodiments of the present invention.

At a high level, FIGS. 2 and 3 illustrate example network environments 200 and 300 suitable for implementing various embodiments disclosed herein. These networks are used to deliver resources to clients that are communicatively connected to an access network, and each include embodiments of what are referred to interchangeably as "deep caches," "shared caches" or "local caches," which are intended to represent cache devices on the client-side (or subscriber-side) of the access networks. For example, the client-side (or subscriber-side) of the access network can include cache devices that are topologically, physically, and/or logically closer to clients than an access network's Internet connection points. Such so-called "deep caches," "shared caches" or "local caches," which are preferably operated by or on behalf of CDN providers, provide client devices the opportunity to retrieve resources without having to communicate with storage devices across the access networks. More specifically, the network environment 200 in FIG. 2 represents an example of a deep cache infrastructure whereby deep caches 202, 204 and 206 are deployed outside of access networks at a relatively close proximity to the access networks' end-users/subscribers. Likewise, the network environment 300 in FIG. 3 represents an example of a deep cache infrastructure whereby deep caches (e.g., 320a, 320b, 320c) are deployed outside of access networks at a relatively close proximity to the access networks' end-users/subscribers.

In the example configuration of FIG. 2, network environment 200 comprises Internet 101, access network 104, CDN caches (DC) 110, and CDN caches (HOU) 120. Although any number of CDNs can service and deliver content to any of the regions and houses shown in FIG. 2, assume that only a single CDN services and delivers content to the end-users/subscribers of access network 104. In network environment 200, the CDN comprises a CDN Domain Name System (DNS) 201 that resides, at least in part, within Internet 101 (and/or is communicably coupled to Internet 101) and is also communicably coupled across Internet 101 to CDN caches (DC) 110 and CDN caches (HOU) 120. CDN DNS 201 comprises one or more CDN DNS servers that are responsive to requests for content from end-users; and determines, based on several factors and parameters, at least one appropriate or suitable CDN cache for delivering the requested content to end-users.

Still referring to FIG. 2, shared caches 202, 204, and 206 are deployed on the client/subscriber-side of the access network 104. Each shared cache is shared amongst proximately located end-users (e.g., via wired access, Wi-Fi hotspot, powerlines, etc.). In a preferred embodiment, communication amongst the clients is accomplished by way of a new technology being developed named White Space Wi-Fi (or by way of one or more of any other available and/or suitable wireless spectrums for that matter). Access network 104 comprises a DNS 214 having one or more DNS servers. In addition to providing conventional DNS services to end-users of access network 104, DNS 214 can interact with CDN DNS 201 in furtherance of providing CDN access to end-users of access network 104 (e.g., via redirection).

Figure 4:
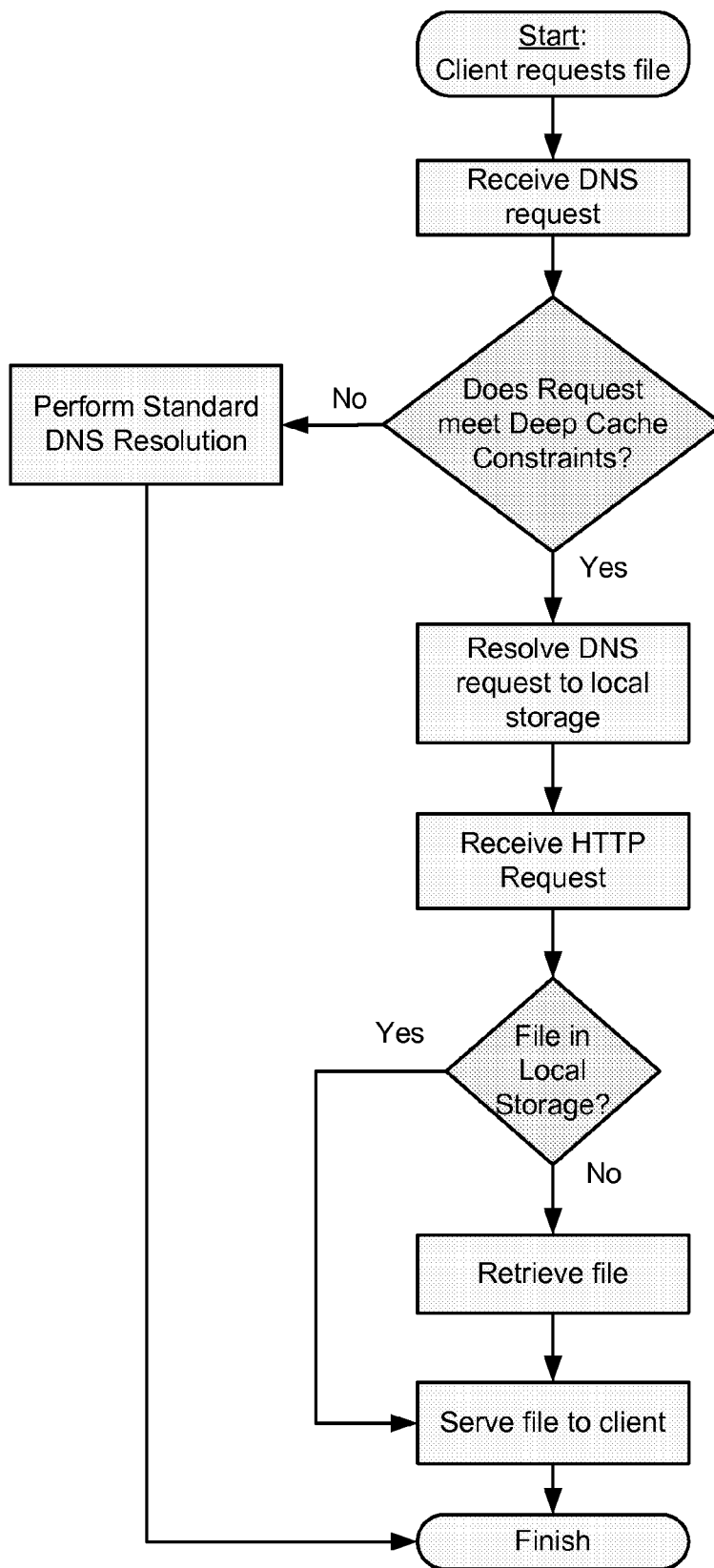
FIG. 4 illustrates an example process for retrieving a resource using the CDN of FIG. 2 in accordance with embodiments of the present invention.

In embodiments described in FIG. 2, various functionality and techniques can be used to effectively override the need for the DNS 214 and DNS 201 in circumstances in which it is optimal for the shared caches 202, 204 and 206 to deliver a resource that is requested by a client. FIG. 4 is a flow diagram illustrating a process for use in delivering a resource to a client in the network environment 200 in which a DNS resolver on a client (or otherwise accessible to a client) redirects the client to a shared cache 202, 204 and 206 as opposed to resolving the client to the CDN caches (e.g., 120), in accordance with embodiments of the present invention. Such a circumstance occurs if the request (e.g., domain name or any other identifying information in the case of a proxy) meets certain "deep cache" criteria and/or thresholds. Exemplary deep cache criteria and/or thresholds can be based on content-based characteristics such as popularity, size, type, genre, creation date, etc., and/or client-based characteristics such as client device type, connection type/speed, storage capacity/availability, etc., and/or any other distinguishing factor or characteristic (e.g., on a hostname basis for DNS requests). If, however, a resource does not meet such criteria or thresholds, then the client engages in normal DNS resolution and is served the requested resource from either a CDN cache 120 or an origin server.

Figure 5:
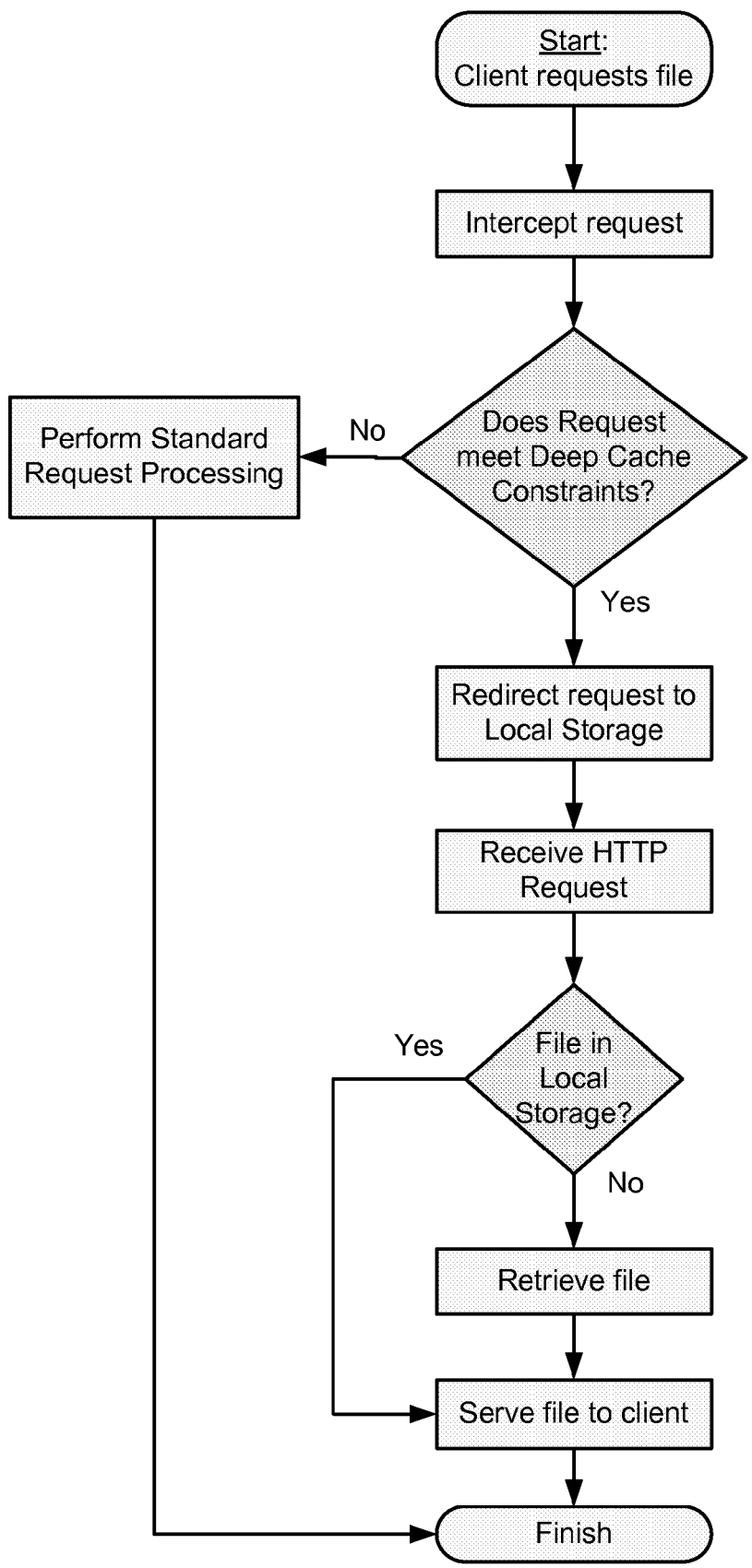
FIG. 5 illustrates an example process for retrieving a resource using the CDN of FIG. 2 in accordance with embodiments of the present invention.

FIG. 5 is a flow diagram illustrating a similar process as in FIG. 4, but instead employs a proxy instead of a DNS resolver on a client. For example, the proxy can be software executing on the client device or a separate device capable of performing proxy server/cache functionality. In another embodiment, intelligent traffic management can be used to complement or supplement DNS processing.

Still referring to FIG. 2 and according to another example embodiment, each end-user (e.g., house) has access to its own domain name resolver (e.g., in conjunction with a PC, laptop, set-top box, Roku Box, smart phone, tablet, etc.). These end-user name resolvers can be pre-populated and/or periodically/intermittently populated (via push and/or pull) with a list or mapping of specific domains that are determined to be popular, desirable, strategic, etc. by one or more content providers, CDNs, third party entities, etc., or any combination thereof (or organically by the domain name resolver itself using, for example, historic/cached data, histograms of traffic patterns, etc.). Additionally, end-user name resolvers can be pre-populated and/or periodically/intermittently populated (via push and/or pull) with a regular expression usable to identify specifically requested domains that are similarly determined to be popular, desirable, strategic, etc. In this manner, content associated with popular (or desirable, strategic, etc.) domains can be preemptively loaded (i.e., pre-fetched) into one or more shared caches so that the domain name resolver can immediately resolve the request for content to a shared cache directly connected (or indirectly connected, but in close proximity, that is, on the client-side of an access network) to the requesting end-user device. For example, if an end-user requests content (e.g., via a web interface, set-top box, Roku$^{SM}$ Box, etc.), the associated end-user domain name resolver can determine if the domain associated with the requested content is deemed popular (e.g., by comparing with the list or mapping of domains, comparing against a regular expression, etc.) and, if so, redirect the end-user device to request content from at least one shared cache. Furthermore, CDN operators, content providers, etc., can employ a centralized and/or regional system to dynamically and strategically distribute such lists/mappings of domains or regular expressions to the various client devices.

Again referring to FIG. 2, another example embodiment employs one or more proxy devices 208, 210 (e.g., DNS proxies) situated between the client devices and DNS 214 of access network 104 whereby the proxies are operable to transparently intercept client requests. Similar to the end-user name resolvers previously described, the proxies 208, 210 can be pre-populated and/or periodically/intermittently populated (via push and/or pull) with a list or mapping of specific domains that are determined to be popular, desirable, strategic, etc. by one or more content providers, CDNs, third party entities, etc., or any combination thereof (or organically by the proxies themselves using, for example, historic/cached data, histograms of traffic patterns, etc.). Additionally, proxies can be pre-populated and/or periodically/intermittently populated (via push and/or pull) with a regular expression usable to identify specifically requested domains that are similarly determined to be popular, desirable, strategic, etc. In this manner, content associated with popular (or desirable, strategic, etc.) domains can be pre-emptively loaded (i.e., pre-fetched) into one or more shared caches so that the proxy can redirect requests for content (e.g., via an HTTP redirect) to one or more shared caches directly connected (or indirectly connected, but in close proximity, that is, on the client-side of an access network) to the requesting end-user device. For example, if an end-user requests content (e.g., via a web interface, set-top box, Roku$^{SM}$ Box, etc.), the proxy 208 or 210 can intercept that request and determine if the domain associated with the requested content is deemed popular (e.g., by comparing with the list or mapping of domains) and, if so, redirect the end-user device to request content from at least one shared cache. Note that a proxy is not necessarily limited to analyzing the domain name associated with a request (as may be the case with a DNS device or agent) and can analyze additional information in the request's URL (e.g., at the HTTP level) such as paths, tokens, hashes, name-value pairs, etc. Furthermore, CDN operators, content providers, etc., can employ a centralized and/or regional system to dynamically and strategically distribute such lists/mappings of domains (or paths, tokens, hashes, name-value pairs, etc.) and/or regular expressions to the various proxies.

According to an example embodiment, the proxies and/or DNS agents/devices can extract additional information from the client request to better perform deep caching functionality (e.g., rendezvous) as described herein. For example, a client request can contain specific information such as the client or end user IP address, in home cache IP address, master cache IP address, content classification data (e.g., title, type, encoding, etc.), delivery protocol, and the like. This specific information can be added to the client request by software executing on the client device, by content providers, by CDNs, or by any other suitable entity capable of modifying client requests.

It is also contemplated that one or more shared caches can perform the proxy functionality as described above. In such a configuration, and assuming the shared cache determines that the requested resource should be served from at least one shared cache (e.g., based on popularity), the shared cache would: i) redirect the client to one or more other shared caches (e.g., if that shared cache does not have a copy or a substantial portion of the requested content and/or the other shared caches do, if network conditions favor delivery from other shared caches, etc.); ii) "hand-off" the request to one or more other shared caches (e.g., transparently to the requesting client via Transmission Control Protocol "TCP") so that the other shared cache(s) can take over the handling of the request and initiate delivery of the requested content in lieu of a redirect; or, iii) serve the content itself (e.g., if that shared cache has a copy or substantial portion of the requested content or can retrieve a copy of the requested resource from another CDN cache or shared cache).

Turning now to FIG. 3, the network environment 300 comprises Internet 101, access network 104, CDN caches (DC) 110, and CDN caches (HOU) 120. Although any number of CDNs can service and deliver content to any of the regions and houses shown in FIG. 3, assume that only a single CDN services and delivers content to the end-users/subscribers of access network 104. In network environment 300, the CDN comprises a CDN Domain Name System (DNS) 201 that resides, at least in part, within Internet 101 (and/or is communicably coupled to Internet 101) and is also communicably coupled across Internet 101 to CDN caches (DC) 110 and CDN caches (HOU) 120. CDN DNS 201 comprises one or more CDN DNS servers that are responsive to requests for content from end-users; and determines, based on several factors and parameters, at least one appropriate CDN cache for delivering the requested content to end-users.

Still referring to FIG. 3, the network environment 300 also comprises shared caches deployed on the client-side of the access network 104. As with FIG. 2, the shared caches shown in FIG. 3 are preferably operated by the CDN provider. In contrast to the embodiments of FIG. 2, the shared caches reside as storage at a plurality of the client homes and are shared amongst the clients via a common network infrastructure 302, 304 and 306, such as, without limitation, wired access, Wi-Fi hotspot, powerlines, etc. (also referred to as a "residential wireless cloud"). In a preferred embodiment, communication amongst the clients is accomplished by way of White Space Wi-Fi or one or more of any other available and/or suitable wireless spectrums. While shared caches 320a-320c in accordance with the embodiment of FIG. 3 are only shown at three clients, it should be appreciated that numerous clients include such shared caches 320a-320c and that an aggregate of such clients that operate shared caches (e.g., 320a and 320b) are referred to as a "community." For example, each of common network infrastructure 302, 304 and 306 can represent such a community.

In accordance with various embodiments described herein, a shared cache 320a, 320b, 320c depicted in FIG. 3 (also referred to as an "in home cache") can be a device situated in residential homes and on residential users' home networks. Such a shared cache acts as a storage device for content that may be consumed by that residential user or other users that are reachable through a residential wireless cloud (e.g., common network infrastructure 302, 304, 306). The storage within the device could be any type of storage including, for example, spinning disk, flash memory, and the like. In addition to the storage, the shared cache has software that allows it to participate as part of a CDN with the ability to load content from the CDN and share content with other similar devices through the residential wireless cloud. To support the exchange of data through the residential wireless cloud, the shared cache will have wireless transmission and receipt capabilities. The shared cache can take on many forms including, for example, a standalone device that acts as an in-line cache in the home network, an end user PC with the CDN-specific software loaded thereon and at least some of the device's storage allocated to this function, or the shared cache can be integrated as a part of an in home appliance such as a television, gaming console or any other network connected devices.

Figure 6A:
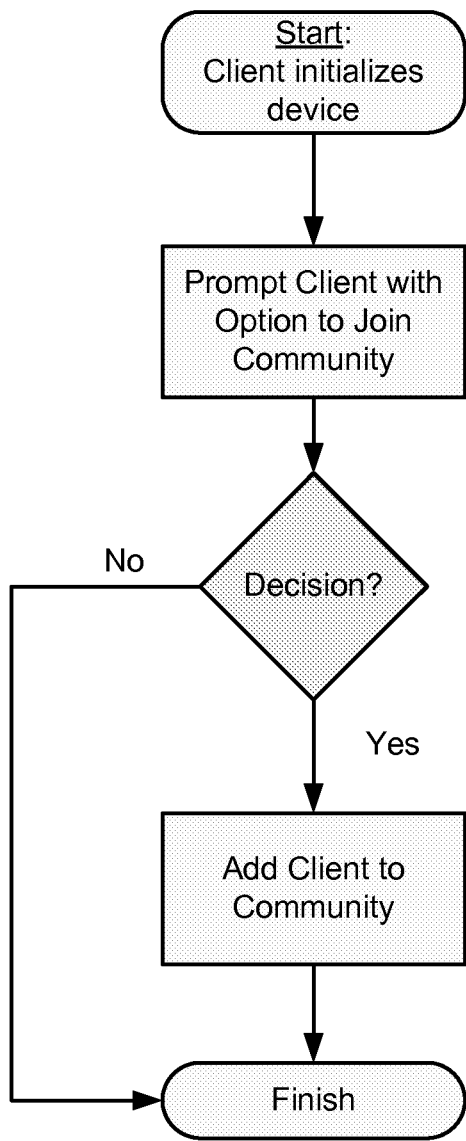
FIG. 6A illustrates an example process for initializing the deep caching infrastructure of FIG. 3 in accordance with embodiments of the present invention.

FIG. 6A illustrates an example process for initializing the deep caching infrastructure of FIG. 3 in accordance with embodiments herein. Upon initialization of a client device (e.g., boot-up, initialization of a process or application, installation of software, etc.), the client device is prompted with an option to join a community. For example, the prompt may be presented via a graphical user interface (GUI) to a user of the client device. Then, if client device (e.g., via the GUI, a preconfigured setting, etc.) returns an affirmative decision to join the community, the client device (and any in-home cache associated therewith) is added to the community. In one embodiment, the client device (and/or its associated in-home cache) sends an "add me to the community" indication to the master cache, community-designated proxy, and/or one or more other members (e.g., shared caches, client devices, in-home caches, etc.) of the community. In response, the master cache, community-designated proxy, and/or one or more other members of the community update their respective community member lists to indicate inclusion of the newest member.

With regard to both network environment 200 and network environment 300, another embodiment of the present invention contemplates a capability for a shared cache deployed within an access network to preemptively (or proactively) download and store/cache (e.g., pre-fetch) content that is deemed popular (preferably occurring during off-peak hours for the access network and/or residential wireless cloud). For example, a shared cache can receive popularity information from its CDN (or one or more content providers, third party entities, etc.) and/or derive its own organic popularity data (e.g., using historical data such as histograms of traffic patterns, etc.) in furtherance of preemptively downloading and storing content that has not yet been (or has been infrequently) requested from the shared cache—depending on the popularity algorithms and policies being employed and enforced. For example, such popularity determinations may be used as a factor in connection with selection of an appropriate shared cache for a particular client.

Continuing with the example embodiment above, the in home cache sends a request (e.g., per a configured time and frequency) to a network based pro-active content loading application (e.g., predictive content engine 312). The request to the predictive content engine 312 contains the usage and other data collected by the in home cache that would be useful in predicting content that may be requested by the end users in the home. This request is preferably implemented using standard HTTP based protocols, although other protocols may be used as well. In turn, the predictive content engine 312 analyzes the data sent from the in home cache and responds with a list of content that it believes the end-users at home may want to watch at a future date. The in home cache then processes the list of content provided by the predictive content engine 312 and uses a proactive loading algorithm to determine which content in the list, if any, should be loaded. For instance, the in home cache may have a configured set of times or network performance characteristics that specify an appropriate time for proactively loading the content.

Figure 6B:
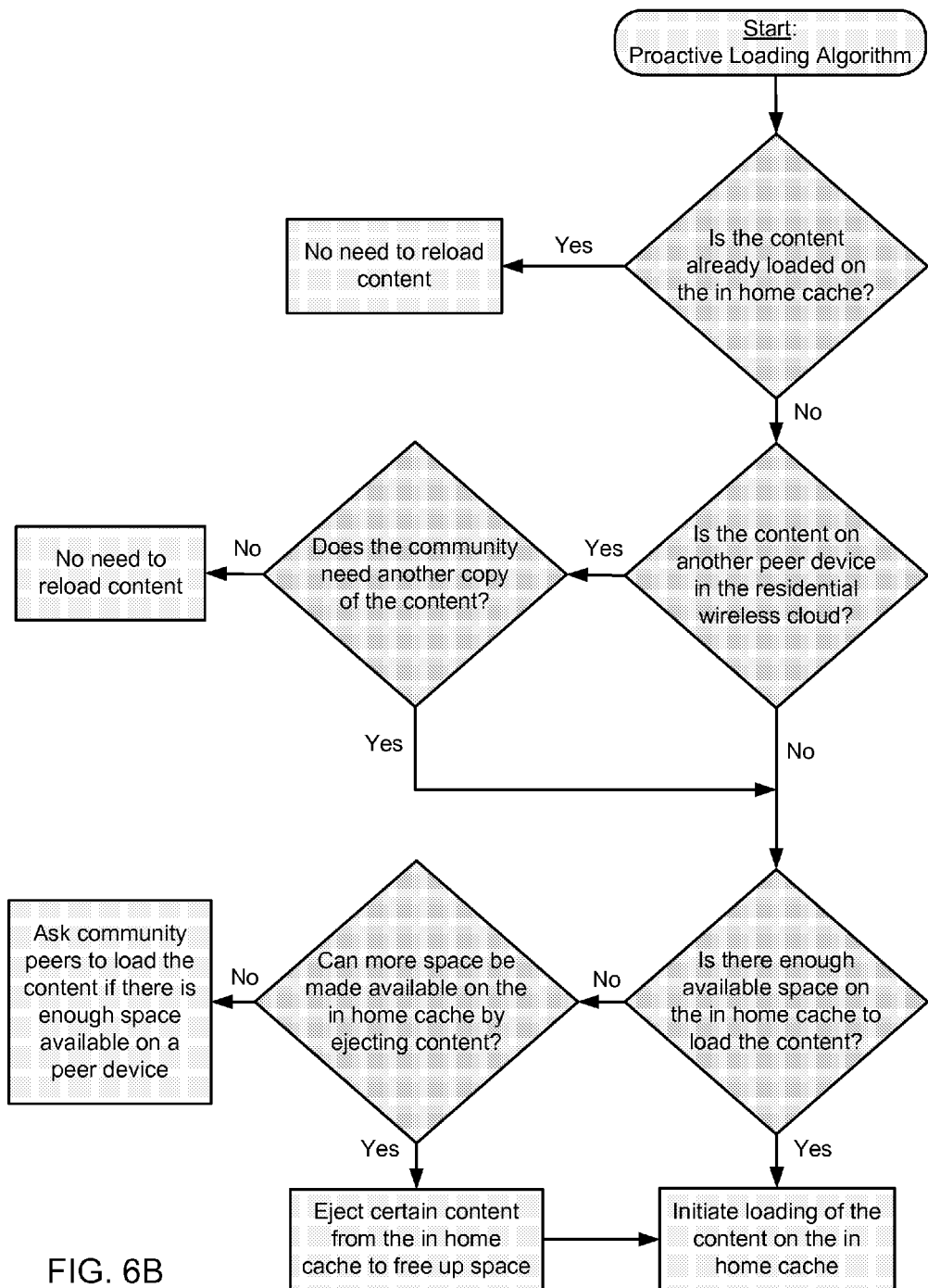
FIG. 6B illustrates an example process for proactively loading content in accordance with embodiments of the present invention.

FIG. 6B is a flow chart showing example processing steps of a proactive loading algorithm used by an in home cache.

Any number of techniques may be used to determine the popularity of a content object. For example, popularity of an object can be determined based on the number of requests and/or the request rate. Popular objects typically have higher request rates or higher number of requests than unpopular objects. Popularity can also be determined by tracking the last X number of request times for an object and then using the difference between the current time and the X number of request times to calculate a running average for how often the object is requested. Similarly, popularity can be gauged on the request rate for an object that is weighted for more recent requests for the object (which is a predictor that the object will be requested again). As another example, an exponential decay method and an artificial neural network could be used to determine the popularity of an object.

Figure 6C:
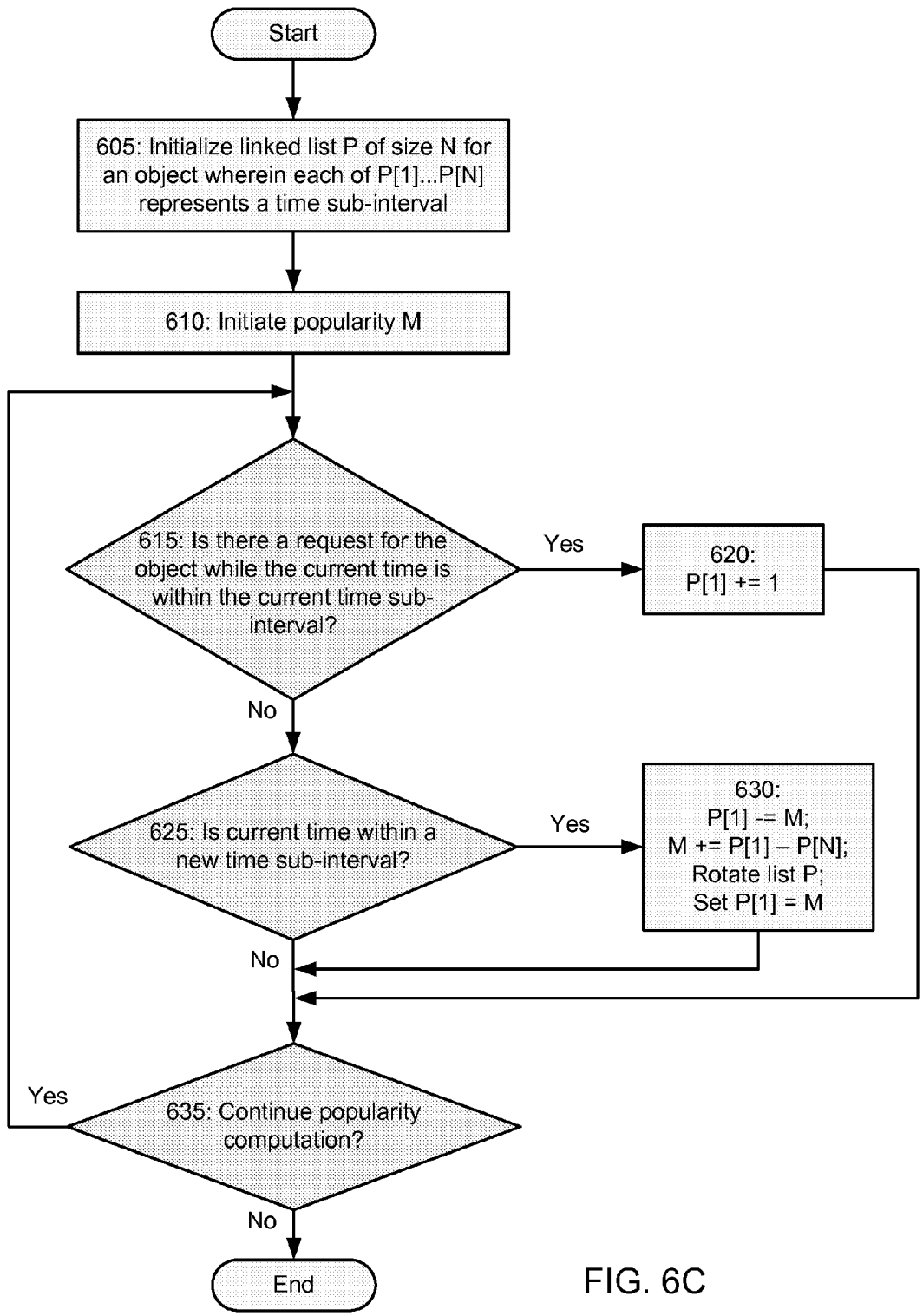
FIG. 6C illustrates an example process for determining popularity in accordance with embodiments of the present invention.

According to an example embodiment of a popularity computation and referring to FIG. 6C, the popularity of an object is based on the request rate of the object which is computed over a sliding time window in a discrete manner. As such, the variable I denotes the time interval over which the popularity of an object is measured. The time interval is divided into N equal sub-intervals of duration I/N. As will be apparent, the time interval is not required to be equally divided and may instead be divided in other manners. Furthermore, a linked list P of size N is created for each object. The value of N determines the quality of approximation (e.g., the smaller the value of N, the coarser the approximation).

The first element P[1] of the list records the number of requests that were received when the current time was within the first sub-interval, the second element P[2] records the number of requests that were received when the current time was within the 2nd interval, and so on. When a new sub-interval is received, the list is rotated such that P[I] becomes P[I+1] (except for P[N] which becomes P[1]); so, for example, P[1] becomes P[2], P[2] becomes P[3], and P[N] becomes P[1]. After the rotation, the new P[1] is reset to zero. Accordingly, only the end time of the first sub-interval needs to be recorded and compared against the current time to check if the list should be rotated. For each new request within the sub-interval, P[1] is simply incremented by 1. In this way, the arrival time of each request need not be recorded.

In another example embodiment, the popularity of an object is simply the sum of all numbers in the list. To make the computation more efficient, the sum of P[2]+P[3]+ . . . +P[N] is stored in a register M. The popularity can then be computed by adding P[1] to M. When a rotation occurs, the new value of M becomes M+=P[1]−P[N]. Note that the popularity of an object may be queried constantly. Thus, to avoid the extra addition involved for each such inquiry, the value of P[1] can be set to M after the rotation. Then, the value of P[1] is the popularity of the object.

Referring to FIG. 6C, an example popularity computation algorithm may be summarized as follows. The linked list P of size N for an object, wherein each of P[1] . . . P[N] represents a time sub-interval, is initialized (at 605). The popularity M is also initialized (at 610). If there is a request for the object while the current time is within the current time sub-interval (at 615), then the value of P[1] is incremented by 1 (at 620). If the current time is within a new time sub-interval (at 625), then the value of P[1] is decremented by the value of M, M is incremented by P[1]−P[N], the list P is rotated, and P[1] is set to the value of M (at 630). Then, provided the popularity computation is continued (at 635), that is, the popularity computation is not terminated, the popularity computation algorithm repeats itself.

Furthermore, any number of techniques may be used to initiate replication of an object. A cache server (or in home cache) might replicate an object on the first request by a client for the object. Alternatively, the cache server (or in home cache) may be tuned to wait until a specific number or range of requests are received for the object. In other implementations, the object may be pulled or replicated if the object is more popular (e.g., has a higher request rate) than the least popular object currently in storage. In yet another alternative, the replicating decision can be a function of the popularity of the object, the cost of storing the object, the (available) storage capacity of the cache server (or in home cache) and/or the type of storage (e.g., spinning disk, flash memory, etc.), the cost of pulling the object from the network (e.g., network capacity), as well as any other relevant cost factors. Note that since the popularity of objects may change significantly with time, initiating a pull decision of an object based purely on a fixed threshold does not necessarily capture this dynamic nature of popularity.

A replication policy that compares against the least popular of replicated objects has its limitations, although the policy does not use a fixed threshold. Consider where the storage is only half full but all the replicated objects are extremely popular. Since only objects exceeding the least popular of the replicated objects will be replicated under this replication policy, objects with moderate popularity will be rejected despite the fact that there is plenty of storage space available and the objects are reasonably popular.

Accordingly, a replication scheme should be able to automatically adjust the replication threshold by taking into consideration the dynamic nature of popularity and the available storage capacity. If there are more popular objects than the storage capacity allows, the replication scheme should raise the threshold. If there is more available storage capacity, the replication scheme should decrease the threshold so that more objects can be stored.

Figure 6D:
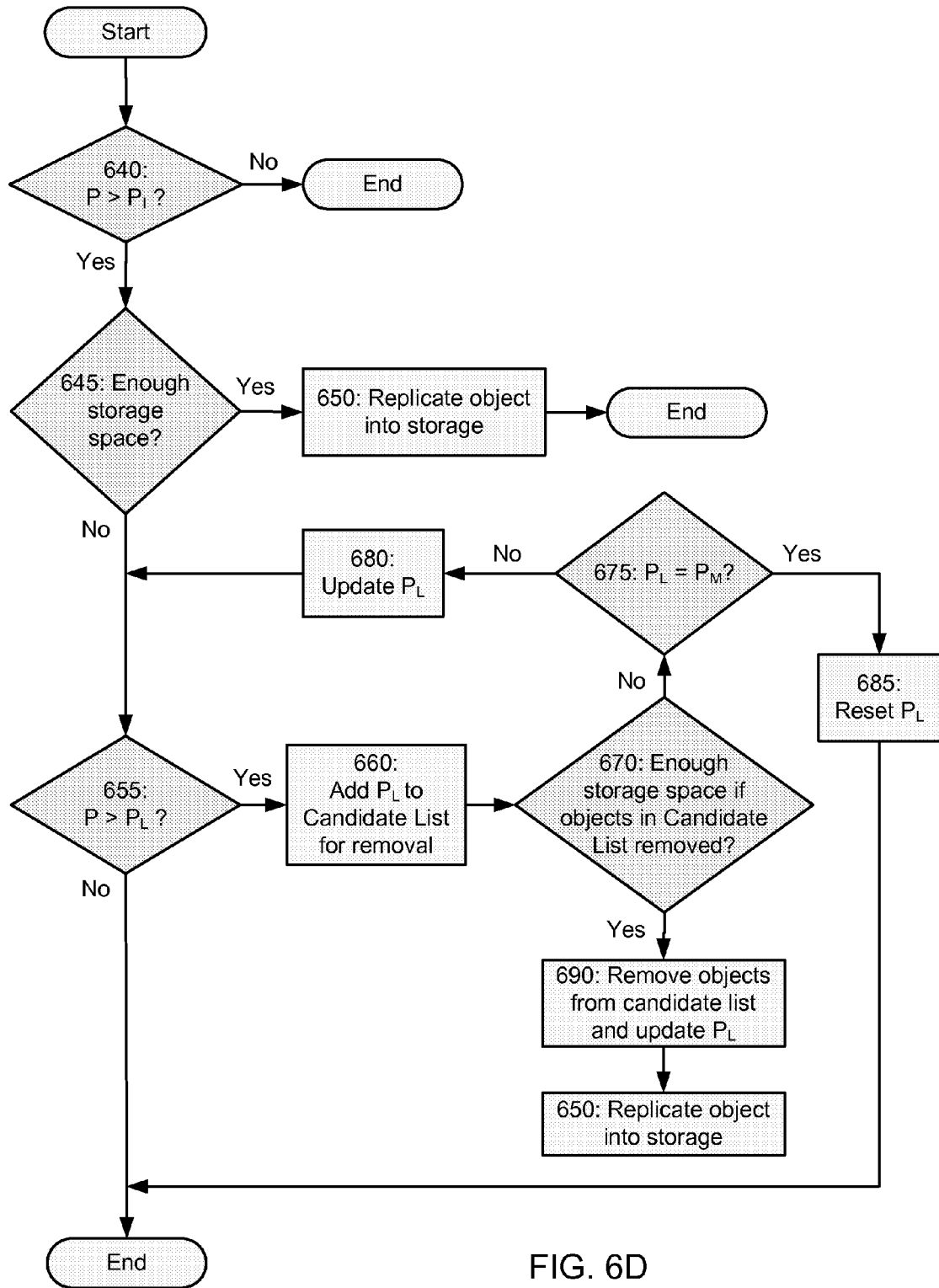
FIG. 6D illustrates an example process for replicating objects in accordance with embodiments of the present invention.

According to an example embodiment of a replication scheme and referring to FIG. 6D, an object is replicated into storage (at 650) when the popularity P of the object is greater than the initial threshold $P_I$ (at 640) and when there is enough space in the storage to replicate the object (at 645). If there is not enough storage to replicate the requested object, a replacement algorithm is performed in which the popularity P of the object is compared against the popularity $P_L$ of the least popular object in the storage (at 655). If P is greater than $P_L$, the current least popular object is added to a candidate list for removal (at 660). If it is determined that upon removing the object(s) in the candidate list (initially only the most recent least popular object) there would be enough storage (at 670), then the object(s) in the candidate list are removed and $P_L$ is updated (at 690), and then the object is replicated into storage (at 650). If, on the other hand, it is determined that upon removing the object(s) in the candidate list there would not be enough storage (at 670), then it is determined whether $P_L$ is $P_M$ (i.e., where $P_M$ is the current most popular object) (at 675) and, if so, $P_L$ is reset to the initial least popular object (at 685) and the operation ends without replication (i.e., there would not be enough storage if all $P_L$ through $P_M$ objects were removed). If $P_L$ is not yet $P_M$, then $P_L$ is updated (i.e., iterated) and the operation cycles again to step 655. Note that the candidate list mitigates the risk of removing one or more objects from storage before ever replicating an object since, as the case may be, the object may not even be replicated after performing the removal operations (e.g., because the object is larger than the overall storage capacity).

In an example embodiment, an in home cache (e.g., shared cache 320a, 320b, 320c) has the capability of collecting and storing usage data for the client devices that are requesting content from within the community or common network infrastructure to which it is connected. For example, this data could be a record of actual content played on in home devices, information describing other internet usage occurring in the home, GPS information that provides physical location data, demographic or user preference data entered by users in the home through an interface provided by the software on the in home cache, etc.

Referring again to FIG. 3, the community of shared caches can use various techniques for request handling/processing, distributed storage, and delivery of content. For example, in one example embodiment a particular shared cache in the community is designated as a master cache (e.g., shared cache 320a) while the other shared caches in the community function in a subordinate manner to this master cache. The master/subordinate designations can be assigned by the CDN, content provider, and/or by the community of shared caches themselves. Content requests originating within the community can be routed through the master cache or transparently intercepted similar to the proxy functionality previously discussed. Upon receiving such a request, the master cache can determine whether or not the request should be serviced by one or more of the shared caches in the community (or, possibly, one or more shared caches in one or more separate communities) based on techniques previously described (e.g., popularity, filtering against domain lists/mappings or regular expressions, etc.). Or, alternatively, the master cache can receive a request from a client device in the community that has already made such a determination via the client domain name server (i.e., wherein the client's domain name server resolved the request to the master cache). Either way, if it is determined that the request should be serviced from within the community, the master cache can (initially or further) redirect the requesting client to one or more shared caches in the community, and/or service the request and initiate delivery of the content itself.

It should be noted that the master cache may or may not be associated with (or operated in conjunction with) a particular client or house within the community. In other words, the master cache could be an independent or stand-alone shared cache as described above with respect to FIG. 2.

It should be further noted that a community-designated proxy (e.g., proxy 310) may be substituted for the master cache in order to perform (transparent) interception and redirection of content requests that originate from within the community to other shared caches within the community.

Still further it should be noted that the functionality associated with a master cache or community-designated proxy is not necessarily limited to a single device. As such, two or more devices within a community may share such master cache and/or proxy functionality (e.g., as a statically or dynamically designated secondary, tertiary, etc., master cache/proxy). For example, such distributed or redundant master cache/proxy functionality can be useful for load-balancing, failover, scalability, etc.

Continuing with the example embodiment above, the master cache can monitor and maintain an awareness of the other subordinate shared servers and the content stored thereon. For instance, the master cache can maintain a table or a mapping that includes, by way of non-limiting example, data associated with content stored on each shared cache (e.g., object names/titles, object/file sizes, partial object/file data, specific content location information such as URLs or portions thereof, etc.), load and/or storage capacity of each shared cache, cache status information (e.g., whether or not a shared cache is functional or online), global popularity of stored content (i.e., per a CDN or content provider), local popularity of stored content (i.e., per one or more communities), and the like. The master cache can periodically/intermittently pull this information from each subordinate shared cache and/or each shared cache can periodically/ intermittently push this information to the master cache. Having collected such community awareness information, the master cache can then use this information to redirect content requests originating within the community to the most appropriate or suitable shared cache(s) in the community. Community awareness information can also be used in furtherance of traffic engineering techniques such as bandwidth throttling (due to the asymmetric nature of CDN traffic flows) and load shedding amongst the community of shared caches.

Note that a content request can be serviced by one or more caches that serve one or more different portions of the requested content to the requesting client (simultaneously and/or at different times).

In yet another example embodiment with reference to FIG. 3, a common addressing scheme is used to determine the most appropriate or suitable shared cache(s) in the community for servicing a request for content. As such, each shared server in the community would be assigned a common address (e.g., IP address). Assume, for example, that a client within the community makes a content request and it is determined that the requested content should be served from a shared cache within the community (i.e., the determination being made via the client's name server, master cache, or via a community-designated proxy, as previously discussed). In such a case, the client's name resolver would resolve the request to the common address, or the proxy would redirect the request to the common address. Thus, by using the common address the client would send (or broadcast) the request to each shared cache in the community and, in doing so, the client can select which shared cache(s) will ultimately serve the content (typically the first shared cache to respond with an indication that it is able and willing to service the request).

It is also contemplated that a master cache or community-designated proxy can further use this common addressing scheme on a more granular level. For example, a master cache or community-designated proxy can associate a common address to particular content (thus assigning the common address to only those shared caches that have the particular content) such that requests will be redirected to only those shared servers that have the particular content. In one example embodiment, a first set of shared caches in a community are designated for storing and servicing a first type of content/service, while a second set of shared caches are designated for storing and servicing a second type of content/service. As such, the first set of shared caches could be assigned a first common address so that requests for a first type of content would be redirected (or resolved) to only the first set, while the second set of shared caches could be assigned a second common address so that requests for a second type of content would be redirected (or resolved) to only the second set, and so on.

According to yet another example embodiment, a client can issue a type of point-to-multipoint content request (e.g., per a redirect) to each shared cache in the community. To do this, the client would be provided (e.g., by a CDN, content provider, master cache, community-designated proxy, etc.) a list of addresses (e.g., IP addresses) of each shared cache in the community. In this sense, the designation of the community of shared caches can be access network or ISP independent. Note that the list can be dynamically updated and modified by whichever entity provides the list to the client.

In another example embodiment, the community of shared caches is based on one or more subnets of the access network or ISP. In this configuration, a client can issue a content request (e.g., per a redirect) to each shard cache in the community by broadcasting the request to one or more access network or ISP subnet address.

A further embodiment contemplates the use of multicasting (e.g., IP multicasting) for content request routing/handling among a community of shared caches. In such a configuration, each shared cache (e.g., upon going online) would register with a multicast address group associated with each of the other shared caches in the community (e.g., using Internet Group Management Protocol "IGMP"). Thus, a client associated with a shared cache can issue a content request (e.g., per a redirect) to its multicast group to which each of the other shared caches in community have subscribed. In an example embodiment, the master cache or community-designated proxy administers and manages the multicast groups by keeping track of which shared caches belong to the community.

Deep Caching with Wireless Networks

At a high level, FIGS. 7-10 illustrate example network environments 700, 800, 900, and 1000, respectively, which are suitable for implementing various embodiments disclosed herein. Similar to the configurations previously described, these networks are used to deliver resources to clients (also commonly referred to as user equipment "UE") that are communicatively connected to a wireless network (examples of which are described below), and each include embodiments of what are referred to interchangeably as "deep caches," "shared caches," "local caches," or "transparent caches," (collectively referred to as "flex caches") which are intended to represent cache devices situated within or around the wireless network. Such so-called "flex caches," which can be operated by or on behalf of CDN providers, wireless network providers, content providers, other third party entities, etc., and/or any combination thereof, provide client devices (or UEs) the opportunity to request and retrieve resources without having to necessarily communicate with storage devices/servers across the Internet (and/or any other wireline network to which the wireless network directly or indirectly connects).

In particular, the flex caches (and, in some example implementations, in connection with particular servers such as redirection/translation servers) provide deep caching functionality as previously described such that content can be stored/cached within the wireless network (e.g., preemptively or dynamically caching content, for example, from content providers associated with the CDN). According to example embodiments, the flex caches can also provide transparent caching of content as the content is retrieved upstream from the CDN (or from other storage devices/servers either directly or indirectly connected to or located in the Internet). In another example embodiment, the flex caches can pre-fetch content (e.g., when content becomes or is deemed popular or desirable), thus enabling faster and more efficient delivery of content to clients/UEs of the wireless network.

It should be noted that the wireless networks described herein are not limited to any particular wireless network configuration, standard, protocol, or generation. For instance, wireless networks are contemplated to include second, third, or fourth generation (2G/3G/4G) mobile/cellular networks such as, for example, 3G UMTS/HSDPA/HSUPA networks (Universal Mobile Telecommunications System/High-Speed Downlink Packet Access/High-Speed Uplink Packet Access), GSM/GPRS networks (Global System for Mobile Communications/General Packet Radio Service), 4G LTE/WiMax networks (Long Term Evolution/Worldwide Interoperability for Microwave Access), CDMA networks (Code Division Multiplex Access), and the like, as well as Wi-Fi networks, satellite networks, and/or any other networks or wireless spectrums capable of directly or indirectly delivering content to wirelessly connected clients/UEs. The embodiments described herein also contemplate integration and interoperability with future configurations, standards, protocols, and generations of wireless networks.

Figure 7:
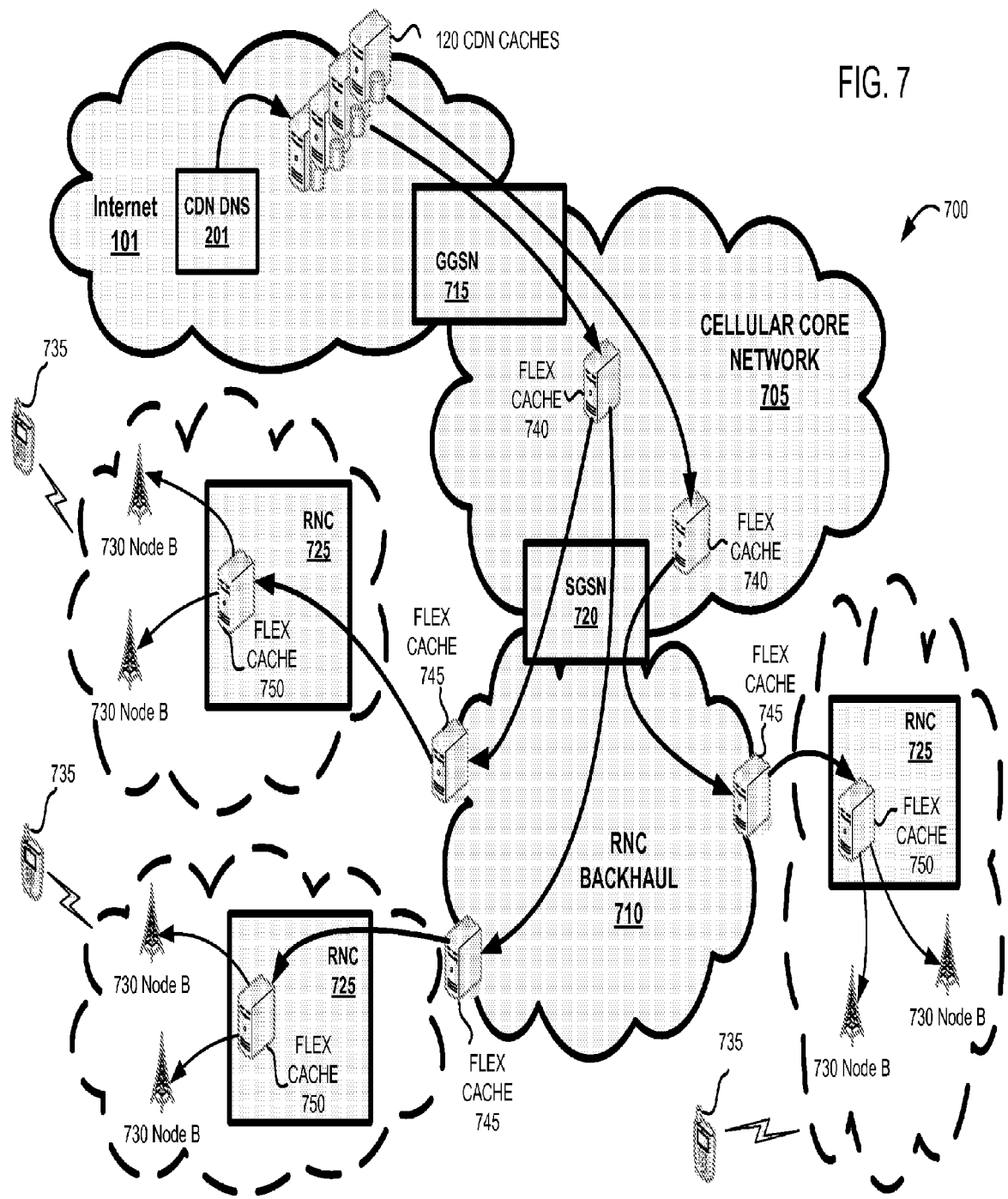
FIG. 7 illustrates the CDN of FIG. 1 adapted for a wireless network in accordance with embodiments of the present invention.

Turning now to FIG. 7, the example network environment 700 comprises Internet 101, CDN caches 120, at least one CDN DNS 201, cellular core network 705, and Radio Network Controller (RNC) backhaul network 710. Internet 101 is communicably coupled with cellular core network 705 via at least one Gateway GPRS Service Node (GGSN) 715, and cellular core network 705 is communicably coupled with RNC backhaul network 710 via at least one Serving GPRS Support Node (SGSN) 720. RNC backhaul network 710 is communicably coupled with one or more RNCs 725, and the RNCs 725 are communicably coupled with one or more Base Transceiver Stations (BTSs) or Node Bs 730 (the RNCs 725 and BTSs/Node Bs 730 collectively form a so-called Radio Access Network "RAN"). Node Bs 730 are operable to wirelessly communicate with UEs 735 (e.g., clients using wireless devices such as smart phones, tablets, laptops, or any other devices suitable for wirelessly connecting to a network).

Example network environment 700 further comprises a cache hierarchy in the wireless network including zero or more flex caches 740 situated at or between GGSN 715 and SGSN 720 (e.g., within cellular core network 705), zero or more flex caches 745 situated at or between SGSN 720 and RNCs 725 (e.g., within RNC backhaul network 710), and zero or more flex caches 750 situated at or between RNCs 725 and their respective Node Bs 730.

Although any number of CDNs can service and deliver content to wireless networks, it should be noted that as in the previous embodiments and figures, assume that only a single CDN services and delivers content to the clients/UEs 735 in FIGS. 7-10.

Still referring to FIG. 7, and in general operation, the CDN is operable to deliver content to clients/UEs 735 via any of the flex caches in the cache hierarchy of the wireless network. For example, and in conjunction with techniques previously described, content may be preemptively stored on any of the flex caches 740, 745, or 750, to anticipate requests for content from clients/UEs 735. Content may be stored on different caches within the hierarchy depending on the policies implemented by the CDN, content provider, and/or the wireless network provider (e.g., popularity computation algorithms and replications policies per FIGS. 6B-6D). The policies can include factors such as, for example, content popularity, content type, content size, information associated with the client or the user equipment, transmission protocol, data format, network conditions, etc. Example data flows (i.e., requests for content, inter-cache communications, redirection of requests, distributed storage schemes/protocols/communications, and delivery of content, etc.) are discussed below with respect to FIGS. 8-10.

Figure 8:
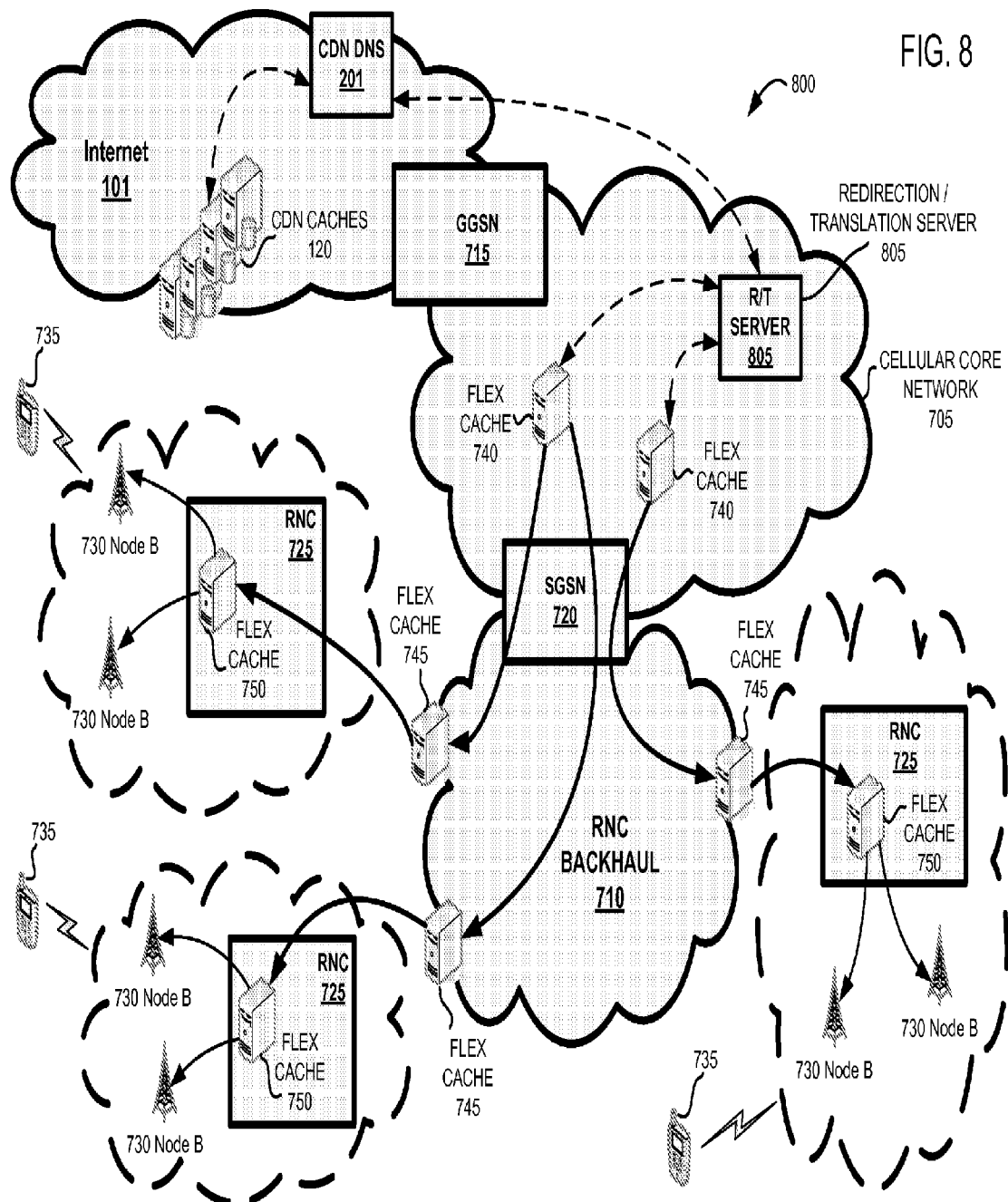
FIG. 8 illustrates the CDN of FIG. 1 adapted for a wireless network in accordance with embodiments of the present invention.

FIG. 8 depicts an example network environment 800 similar to the example network environment 700 of FIG. 7, and further comprises one or more redirection/translation servers 805 situated at or between GGSN 715 and SGSN 720 (e.g., within the cellular core network 705). Redirection/translation server 805 is configured to handle and redirect requests for content within the wireless network. As conventional wireless networks (i.e., cellular/mobile networks) are currently not capable of (or are otherwise ineffective at) handling/processing traditional Layer 3 or higher communications (e.g., DNS name resolving, HTTP requests for content, File Transfer Protocol "FTP" or Peer-to-Peer "P2P" communications, etc.), the redirection/translation server 805 can be used to translate requests (e.g., via decapsulation and re-encapsulation) from the wireless domain and then process those requests as if a traditional wireline network device (e.g., DNS server, CDN cache/server, proxy server, etc.) were handling the request. In an example embodiment, the redirect/translation server 805 is configured to transparently intercept and handle a request for content from a client/UE 735 before the request exits the wireless network (i.e., before the request is passed to the Internet for further handling/processing). According to another example embodiment, redirection/translation server 805 is capable of redirecting sessions within the wireless network. Using information about where or how content is stored within the CDN (i.e., either in the Internet 101 or within the cache hierarchy of the wireless network at the various flex caches), the redirection/translation server 805 can redirect a content request to a flex cache suitable for efficiently delivering content to the requesting client/UE 735.

Similar to embodiments previously described, redirection/translation servers can be pre-populated and/or periodically/intermittently populated with a list or mapping of specific domains that are determined to be popular, desirable, strategic, etc. by one or more content providers, CDNs, third party entities, etc., or any combination thereof (or by even the redirection/translation servers themselves using, for example, historic/cached data). Note that regular expressions may be used in addition to the list or mapping of specific domains as previously described. In this manner, content associated with popular (or desirable, strategic, etc.) domains can be preemptively loaded into one or more flex caches so that the translation/redirection servers can redirect UE-initiated requests for content (e.g., via an HTTP redirect) to one or more flex caches. For example, if a UE requests content, the redirection/translation server 805 can handle/process that request and determine if the domain associated with the requested content is deemed popular (e.g., by comparing with the list or mapping of domains, comparing against a regular expression, etc.) and, if so, redirect the UE to request content from at least one flex cache. Furthermore, CDN operators, content providers, etc., can employ a centralized and/or regional system to dynamically and strategically distribute such lists/mappings of domains (or regular expressions) to the various redirection/translation servers.

According to example embodiments, the suitability of the flex cache for delivering the content may be based on factors such as, for example, whether the flex cache already has a copy (or at least a portion) of the requested content, the proximity of the flex cache to the client/UE (physically and/or logically), network conditions within the wireless network, global or local popularity of the content, content size, content type, transmission protocol, data format, information associated with the client or user equipment, etc. Redirect/translation server 805 can become aware of where or how content is stored within the wireless network via updates (e.g., push or pull) from the flex caches (e.g., either individually or via a hierarchical flow of information) or from the CDN devices in the Internet 101 (e.g., CDN DNS 201 or CDN caches 120).

Figure 9:
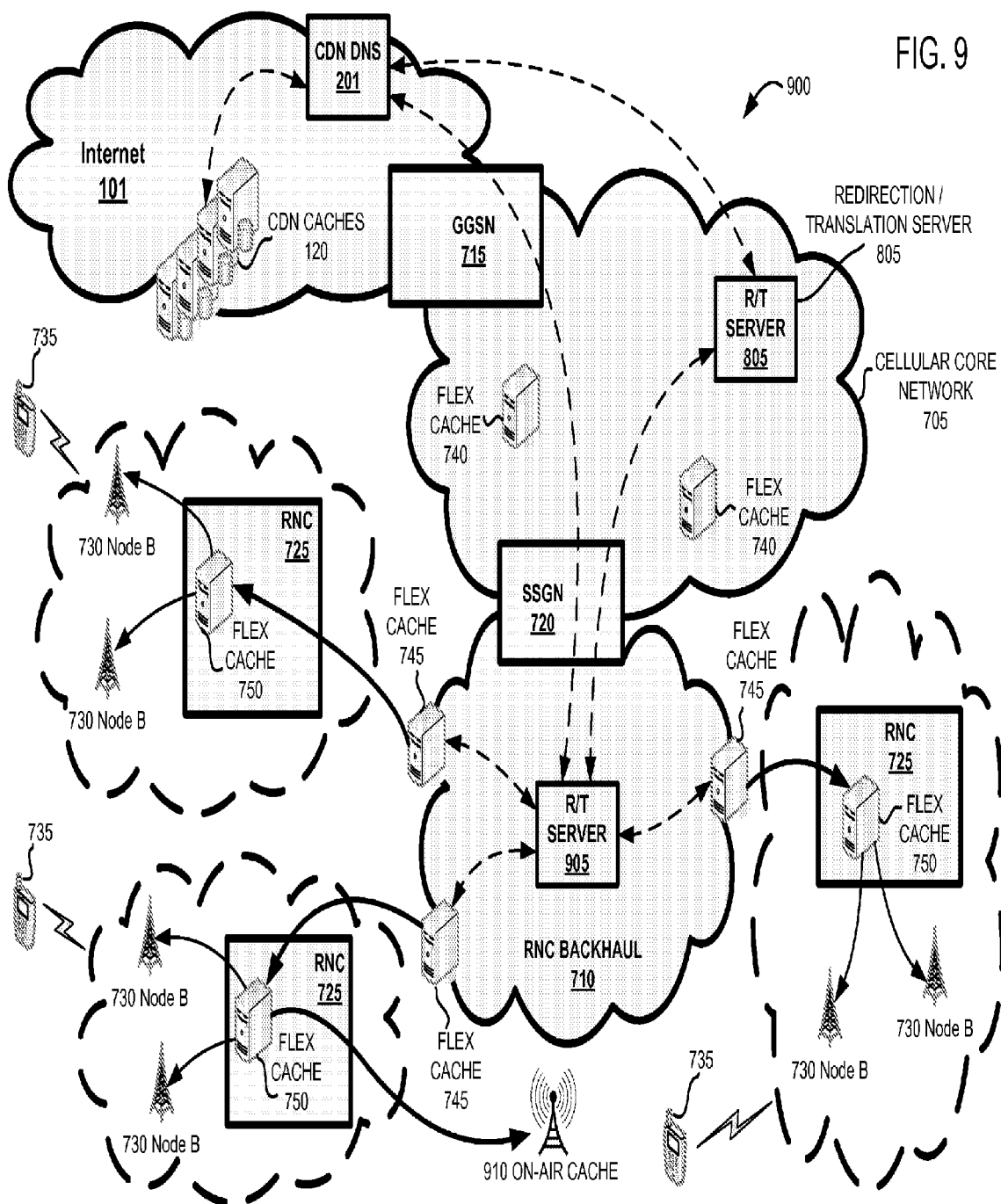
FIG. 9 illustrates the CDN of FIG. 1 adapted for a wireless network in accordance with embodiments of the present invention.

FIG. 9 depicts an example network environment 900 similar to the example network environment 800 of FIG. 8, and further comprises one or more redirection/translation servers 905 situated at or between SGSN 720 and RNCs 725 (e.g., within the RNC backhaul network 710). In addition to a flex cache hierarchical structure, example network environment 900 further represents a redirection/translation server hierarchical structure. As such, redirection/translation server functionality can be utilized at various levels/tiers/depths/etc. within the wireless network.

FIG. 9 additionally shows an on-air cache 910 in communication with a flex cache 750 associated with an RNC 725. According to an example embodiment, the on-air cache 910 serves as a sort of hotspot for UEs 735 (e.g., Wi-Fi at airports, stadiums, malls, hotels, office buildings, etc.), wherein the on-air cache 910 can cache and serve various content in accordance with techniques described herein. The on-air cache 910 has similar access network deep caching functionality and provides similar advantages as the shared caches and in home caches described above. For example, in one embodiment the on-air cache 910 preemptively (or proactively) pre-fetches popular content using algorithms as previously described with respect to FIGS. 6B-6D. In another example embodiment, UEs 735 send (e.g., broadcast) their content requests to both Node Bs 730 and on-air caches 910. If the request is serviceable by the on-air cache 910 (i.e., the on-air cache has a copy of the content or the content is deemed to be adequately popular to merit replication at the on-air cache), UEs 735 can bypass the cellular/mobile network (i.e., the request and/or content would not necessarily have to traverse most if not all of the cellular/mobile network) by having their requested content served locally via the on-air cache 910. An anycast scheme is further contemplated for request routing/handling among Node Bs 730 and on-air caches 910. Note that although the on-air cache 910 is depicted as being communicatively coupled to a flex cache 750 of an RNC 725 in this example embodiment, it is contemplated that the on-air cache 910 can also be communicatively coupled to the CDN via any other flex cache, CDN cache, or similar device over any part of a wireless and/or wireline network.

Figure 10:
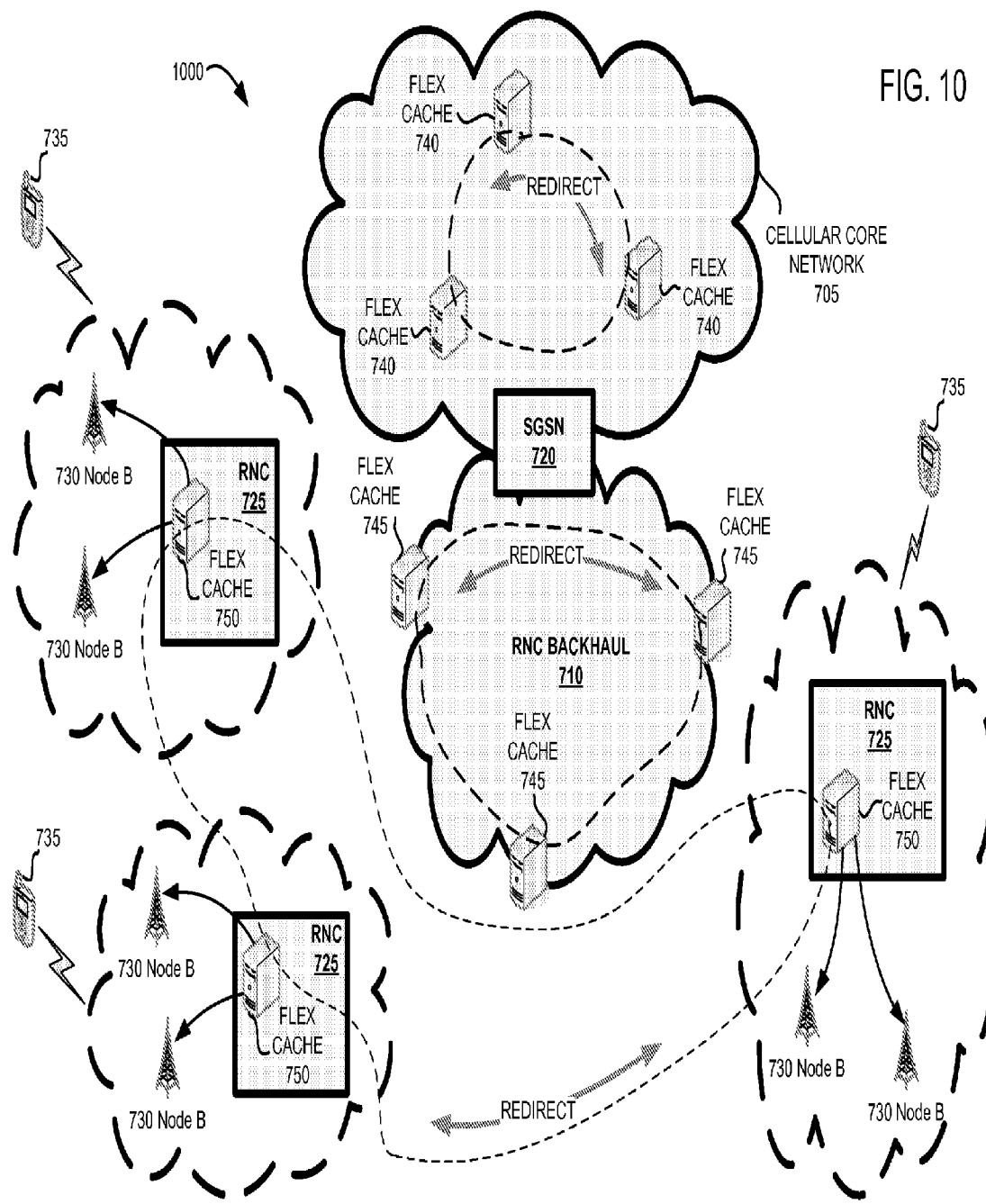
FIG. 10 illustrates the CDN of FIG. 1 adapted for a wireless network in accordance with embodiments of the present invention.

FIG. 10 depicts an example network environment 1000 that represents various data flows (e.g., data plane or content flows, control/service plane or inter-cache communications flows, etc.) among respective flex cache hierarchical levels within the wireless network. Although not shown in FIG. 10, assume that the example data flows (represented by the perforated lines) apply to redirection/translation server hierarchical levels within the wireless network as well. Such data flows can include, for example, redirection of content requests, content request hand-offs among flex caches (e.g., transparent to UEs), peer requests/fills among flex caches, distribution/maintenance of CDN policies, awareness information (e.g., how or where content is stored, network conditions, etc.), and the like. Furthermore, Node Bs 730 may communicate with one another (e.g., peer requests/fills, distributed storage of content, etc.) by way of a White Space Wi-Fi or one or more of any other available and/or suitable wireless spectrums.

Similar to the embodiments described with respect to FIG. 3, it is contemplated that a plurality of proximately situated flex caches (preferably in the same hierarchical tier) can form a community of shared caches having a master flex cache and subordinate flex caches. Likewise, it is also contemplated that a plurality of proximately situated UEs (preferably associated/in communication with the same Node B 730) can form a community of shared caches having a master UE and subordinate UEs. In such a configuration, the UEs could request, store, and serve/distribute content amongst one another (i.e., independent from the CDN or flex caches) in a similar fashion as the community of shared caches previously described.

Note that the placement/configuration of the flex caches and/or redirect/translation servers (or any device, system, module, software/executable code, etc., having functionality consistent with embodiments herein) within a wireless network is not limited to the example network environments of FIGS. 7-10, and it should be appreciated and understood that zero or more of such flex caches and/or redirection/translation servers (and/or functionality associated therewith) can be situated at/configured in any of the various logical and physical locations within a wireless, mobile, satellite, etc., network, or at any point where requests can be routed to an origin server. It should also be appreciated and understood that the flex caches can additionally perform some or all of the functionality of the redirection/translation servers and/or CDN DNS servers as described herein.

Although the present invention has been described with reference to various embodiments, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A method for proactively loading resources on a local caching device associated with a community of local caching devices, wherein the community of local caching devices is communicatively coupled via an access network to at least one content delivery network (CDN) caching device, the method comprising:
   in response to determining that a given resource meets certain popularity criteria and is not stored on the local caching device, determining whether the given resource is stored on at least one other local caching device in the community, and, if so, retrieving the given resource from the at least one other local caching device, wherein the at least one other local caching device has determined that the given resource meets certain popularity criteria and has retrieved the given resource from the at least one CDN caching device via the access network; and
   in response to determining that the given resource is not stored on at least one other local caching device in the community, retrieving the given resource from the at least one CDN caching device via the access network.

2. A method as recited in claim 1, wherein the community of local caching devices are communicatively coupled to one another via at least one of a shared wireless frequency and a shared powerline.

3. A method as recited in claim 1, wherein the local caching device is a master cache of the community of local caching devices.

4. A method as recited in claim 3, further comprising:
   prompting a given local caching device that is not already associated with the community of local caching devices to join the community of local caching devices; and
   if the given local caching device affirmatively responds to the prompt to join the community of local caching devices, adding the given local caching device to the community of local caching devices.

5. A method as recited in claim 1, wherein the certain popularity criteria comprise at least one of:
   a number of requests for the given resource that were received at the local caching device during a given time interval;
   availability of storage space on the local caching device;
   total capacity of the local caching device;
   type of storage on the local caching device; and
   popularity rankings of other resources stored on the local caching device.

* * * * *